US012732719B2

(12) United States Patent
Yun

(10) Patent No.: US 12,732,719 B2
(45) Date of Patent: Sep. 8, 2026

(54) IMAGE SENSING DEVICE FOR GENERATING HDR IMAGE AND IMAGING DEVICE INCLUDING THE SAME

(71) Applicant: SK hynix Inc., Icheon-si (KR)

(72) Inventor: Gun Hee Yun, Icheon-si (KR)

(73) Assignee: SK hynix Inc., Icheon-si (KR)

(*) Notice: Subject to any disclaimer, the term of this patent is extended or adjusted under 35 U.S.C. 154(b) by 147 days.

(21) Appl. No.: 18/582,398

(22) Filed: Feb. 20, 2024

(65) Prior Publication Data

US 2024/0414456 A1 Dec. 12, 2024

(30) Foreign Application Priority Data

Jun. 8, 2023 (KR) ........................ 10-2023-0073621

(51) Int. Cl.

| | |
|---|---|
| ***H04N 25/78*** | (2023.01) |
| ***H04N 23/667*** | (2023.01) |
| ***H04N 25/51*** | (2023.01) |
| ***H04N 25/59*** | (2023.01) |

(52) U.S. Cl.

CPC ........... *H04N 25/78* (2023.01); *H04N 23/667* (2023.01); *H04N 25/51* (2023.01); *H04N 25/59* (2023.01)

(58) Field of Classification Search

CPC ........ H04N 25/78; H04N 25/51; H04N 25/59; H04N 23/667

See application file for complete search history.

(56) References Cited

U.S. PATENT DOCUMENTS

| | | | | |
|---|---|---|---|---|
| 2019/0246057 | A1* | 8/2019 | Ebihara | H04N 23/741 |
| 2022/0191418 | A1* | 6/2022 | Jung | H04N 25/532 |
| 2024/0147092 | A1* | 5/2024 | Jun | H04N 25/78 |

FOREIGN PATENT DOCUMENTS

| | | | |
|---|---|---|---|
| JP | 2022159833 | A | 10/2022 |
| KR | 1020210109769 | A | 9/2021 |

* cited by examiner

*Primary Examiner* — Nicholas G Giles

(74) *Attorney, Agent, or Firm* — WILLIAM PARK AND ASSOCIATES LTD.

(57) ABSTRACT

An image sensing device includes: a pixel configured to output a reference signal corresponding to a sensing node that is reset and an image signal corresponding to the sensing node in which photocharges are accumulated, in each of a high conversion gain (HCG) mode and a low conversion gain (LCG) mode; an analog-to-digital converter (ADC) configured to sequentially perform analog-to-digital conversion of the reference signal of the HCG mode, the image signal of the HCG mode, the image signal of the LCG mode, and the reference signal of the LCG mode; and a ramp generator configured to generate a first ramp signal that is used for analog-to-digital conversion in the HCG mode, and to generate a second ramp signal that is used for analog-to-digital conversion in the LCG mode while having a waveform different from that of the first ramp signal.

8 Claims, 12 Drawing Sheets

IMAGE SENSING DEVICE FOR GENERATING HDR IMAGE AND IMAGING DEVICE INCLUDING THE SAME

CROSS-REFERENCE TO RELATED APPLICATION

This patent document claims the priority and benefits of Korean patent application No. 10-2023-0073621, filed on Jun. 8, 2023, the disclosure of which is incorporated herein by reference in its entirety as part of the disclosure of this patent document.

TECHNICAL FIELD

The technology and implementations disclosed in this patent document generally relate to an image sensing device capable of generating a high dynamic range (HDR) image, and an imaging device including the same.

BACKGROUND

An image sensing device is a device for capturing optical images by converting light into electrical signals using a photosensitive semiconductor material which reacts to light. With the development of automotive, medical, computer, and communication industries, the demand for high-performance image sensing devices is increasing in various fields such as smart phones, digital cameras, game machines, IoT (Internet of Things), robots, surveillance cameras, and medical micro cameras.

Recently, to provide high-quality images, interest in HDR images is rapidly increasing, and various techniques capable of acquiring HDR images are being developed. Among such techniques, technology for varying a conversion gain of a pixel that detects incident light and converts the incident light into an electrical signal can relatively accurately acquire images for each of high illuminance and low illuminance, but there is a problem in that much more resources are consumed for hardware implementation for high-illuminance and low-illuminance images.

SUMMARY

In accordance with an embodiment of the disclosed technology, an image sensing device may include: a pixel configured to output not only a reference signal corresponding to a sensing node that is reset in each of a high conversion gain (HCG) mode in which the sensing node has a first capacitance and a low conversion gain (LCG) mode in which the sensing node has a second capacitance greater than the first capacitance, but also an image signal corresponding to the sensing node in which photocharges are accumulated; an analog-to-digital converter (ADC) configured to sequentially perform analog-to-digital conversion of the reference signal of the HCG mode, the image signal of the HCG mode, the image signal of the LCG mode, and the reference signal of the LCG mode; and a ramp generator configured to generate a first ramp signal that is used for analog-to-digital conversion in the HCG mode, and to generate a second ramp signal that is used for analog-to-digital conversion in the LCG mode while having a waveform different from that of the first ramp signal.

In accordance with another embodiment of the disclosed technology, an imaging device may include: an image sensing device configured to generate image data based on each of a reference signal corresponding to a sensing node that is reset and an image signal corresponding to the sensing node in which photocharges are accumulated, in each of a high conversion gain (HCG) mode in which the sensing node has a first capacitance and a low conversion gain (LCG) mode in which the sensing node has a second capacitance greater than the first capacitance; and an image signal processor configured to generate a high dynamic range (HDR) image using image data generated in the HCG mode and image data generated in the LCG mode. The image sensing device may include: an analog-to-digital converter (ADC) configured to sequentially perform analog-to-digital conversion of the reference signal of the HCG mode, the image signal of the HCG mode, the image signal of the LCG mode, and the reference signal of the LCG mode; and a ramp generator configured to generate a first ramp signal that is used for analog-to-digital conversion in the HCG mode and to generate a second ramp signal that is used for analog-to-digital conversion in the LCG mode while having a waveform different from that of the first ramp signal.

In accordance with another embodiment of the disclosed technology, an imaging device may include: a pixel configured to output a reference signal corresponding to a sensing node that is reset and an image signal corresponding to the sensing node in which photocharges are accumulated, in each of a high conversion gain (HCG) mode in which the sensing node has a first capacitance and a low conversion gain (LCG) mode in which the sensing node has a second capacitance greater than the first capacitance; an analog-to-digital converter (ADC) configured to sequentially perform analog-to-digital conversion of the reference signal of the HCG mode, the image signal of the HCG mode, the image signal of the LCG mode, and the reference signal of the LCG mode; and a ramp generator configured to generate a first ramp signal that is used for analog-to-digital conversion in the HCG mode, and to generate a second ramp signal that is used for analog-to-digital conversion in the LCG mode. Each of the first ramp signal and the second ramp signal may have a negative slope. Further, a voltage level at which the second ramp signal may start to fall for readout of the image signal of the LCG mode is lower by a signal offset than a voltage level at which the second ramp signal starts to fall for readout of the reference signal of the LCD mode.

BRIEF DESCRIPTION OF THE DRAWINGS

The above and other features and beneficial aspects of the disclosed technology will become readily apparent with reference to the following detailed description when considered in conjunction with the accompanying drawings.

DETAILED DESCRIPTION

Figure 1:
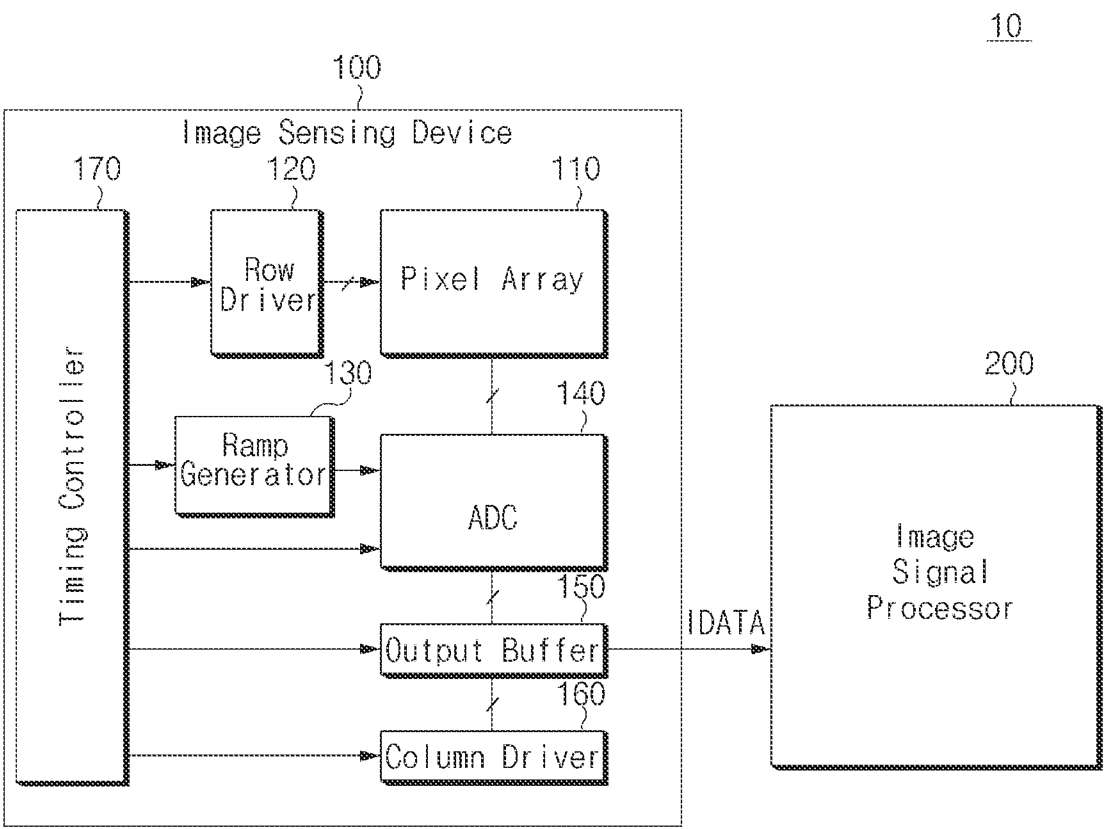
FIG. 1 is a block diagram illustrating an example of an imaging device based on some implementations of the disclosed technology.

This patent document provides implementations and examples of an image sensing device capable of generating a high dynamic range (HDR) image and an imaging device including the same that may be used in configurations to substantially address one or more technical or engineering issues and to mitigate limitations or disadvantages encountered in some image sensing devices in the art. Some implementations of the disclosed technology relate to an image sensing device capable of generating high dynamic range (HDR) images using relatively simple hardware and an imaging device including the same. The disclosed technology provides various implementations of an image sensing device and the imaging device including the same, that can perform analog-to-digital conversion using a pair of one comparator and one counter for each column line (or each pixel) of a pixel array, thereby significantly reducing the size of an analog-to-digital converter (ADC).

Reference will now be made in detail to the embodiments of the disclosed technology, examples of which are illustrated in the accompanying drawings. Wherever possible, the same reference numbers will be used throughout the drawings to refer to the same or like parts. While the disclosure is susceptible to various modifications and alternative forms, specific embodiments thereof are shown by way of example in the drawings. However, the disclosure should not be construed as being limited to the embodiments set forth herein.

Hereafter, various embodiments will be described with reference to the accompanying drawings. However, it should be understood that the disclosed technology is not limited to specific embodiments, but includes various modifications, equivalents and/or alternatives of the embodiments. The embodiments of the disclosed technology may provide a variety of effects capable of being directly or indirectly recognized through the disclosed technology.

Various embodiments of the disclosed technology relate to an image sensing device capable of generating high dynamic range (HDR) images using relatively simple hardware, and an imaging device including the same. It is to be understood that both the foregoing general description and the following detailed description of the disclosed technology are illustrative and explanatory and are intended to provide further explanation of the disclosure as claimed.

FIG. 1 is a block diagram illustrating an example of an imaging device 10 based on some implementations of the disclosed technology.

Referring to FIG. 1, the imaging device 10 may refer to a device, for example, a digital still camera for photographing still images or a digital video camera for photographing moving images. For example, the imaging device 10 may be implemented as a Digital Single Lens Reflex (DSLR) camera, a mirrorless camera, or a smartphone, and others. The imaging device 10 may include a device having both a lens and an image pickup element such that the device can capture (or photograph) a target object and can thus create an image of the target object.

The imaging device 10 may include an image sensing device 100 and an image signal processor (ISP) 200.

The image sensing device 100 may be a complementary metal oxide semiconductor image sensor (CIS) for converting an incident light into an electrical signal. The image sensing device 100 may include a pixel array 110, a row driver 120, a ramp generator 130, an analog-to-digital converter (ADC) 140, an output buffer 150, a column driver 160, and a timing controller 170. The components of the image sensing device 100 illustrated in FIG. 1 are discussed by way of example only, and this patent document encompasses numerous other changes, substitutions, variations, alterations, and modifications.

The pixel array 110 may include a plurality of imaging pixels arranged in rows and columns. In one example, the plurality of imaging pixels can be arranged in a two-dimensional (2D) pixel array including rows and columns. In another example, the plurality of imaging pixels can be arranged in a three-dimensional (3D) pixel array. The plurality of imaging pixels may convert an optical signal into an electrical signal on a unit pixel basis or a pixel group basis, where pixels in a pixel group share at least certain internal circuitry. The pixel array 110 may receive driving signals, including a row selection signal, a pixel reset signal and a transmission signal, from the row driver 120. Upon receiving the driving signal, corresponding imaging pixels in the pixel array 110 may be activated to perform the operations corresponding to the row selection signal, the pixel reset signal, and the transmission signal.

Each pixel of the pixel array 110 may have at least two or more different sensitivities. Here, the sensitivity may mean an increase amount of image data IDATA (or an increase amount of a response) with respect to an increase amount of the intensity of incident light. That is, as the sensitivity increases, the amount of increase in image data IDATA in response to an increase in the intensity of incident light increases. As the sensitivity decreases, the amount of increase in image data IDATA in response to an increase in the intensity of incident light decreases. In some implementations, the term "sensitivity" may be determined by a conversion gain.

The row driver 120 may activate the pixel array 110 to perform certain operations on the imaging pixels in the corresponding row based on commands and control signals provided by controller circuitry such as the timing controller 170. In some implementations, the row driver 120 may select one or more imaging pixels arranged in one or more rows of the pixel array 110. The row driver 120 may generate a row selection signal to select one or more rows among the plurality of rows. The row driver 120 may sequentially enable the pixel reset signal for resetting imaging pixels corresponding to at least one selected row, and the transfer signal for the pixels corresponding to the at least one selected row. Thus, a reference signal and an image signal, which are analog signals generated by each of the imaging pixels of the selected row, may be sequentially transferred to the ADC 140. The reference signal may be an electrical signal that is provided to the ADC 140 when a sensing node of an imaging pixel (e.g., floating diffusion node) is reset, and the image signal may be an electrical signal that is provided to the ADC 140 when photocharges generated by the imaging pixel are accumulated in the sensing node. The reference signal indicating unique reset noise of each pixel and the image signal indicating the intensity of incident light may be generically called a pixel signal as necessary.

CMOS image sensors may use correlated double sampling (CDS) to remove undesired offset values of pixels known as the fixed pattern noise by sampling a pixel signal twice to remove the difference between these two samples. In one example, the correlated double sampling (CDS) may remove the undesired offset value of pixels by comparing pixel output voltages obtained before and after photocharges generated by incident light are accumulated in the sensing node so that only pixel output voltages based on the incident light can be measured. In some embodiments of the disclosed technology, the ADC 140 may sequentially sample and hold voltage levels of the reference signal and the image signal, which are provided to each of a plurality of column lines from the pixel array 110.

The ramp generator 130 may generate a ramp signal required for an analog-to-digital conversion (ADC) operation of the ADC 140 under control of the timing controller 170, and may supply the generated ramp signal to the ADC 140.

The ADC 140 may sample and hold the pixel signal for each column upon receiving the pixel signal from each column line of the pixel array 110, may convert the resultant signal into digital signals, and may output the digital signals. In some implementations, the ADC 140 may be implemented as a ramp-compare type ADC. The ramp-compare type ADC may include a comparator circuit for comparing the analog pixel signal with a ramp signal that ramps up or down according to time, and a timer (or counter) for performing counting until a voltage of the ramp signal matches the analog pixel signal.

The output buffer 150 may temporarily hold the column-based image data (i.e., data (IDATA) obtained by analog-to-digital conversion of the pixel signal) provided from the ADC 140 to output the image data. In one example, the image data provided to the output buffer 150 from the ADC 140 may be temporarily stored in the output buffer 150 based on control signals of the timing controller 170. The output buffer 150 may provide an interface to compensate for data rate differences or transmission rate differences between the image sensing device 100 and other devices.

The column driver 160 may select a column of the output buffer upon receiving a control signal from the timing controller 170, and may sequentially output the image data (IDATA), which are temporarily stored in the selected column of the output buffer 150. In some implementations, upon receiving an address signal from the timing controller 170, the column driver 160 may generate a column selection signal based on the address signal, and may select a column of the output buffer 150, thereby outputting the image data (IDATA) as an output signal from the selected column of the output buffer 150.

The timing controller 170 may control operations of the row driver 120, the ramp generator 130, the ADC 140, the output buffer 150, and the column driver 160.

The timing controller 170 may provide the row driver 120, the ramp generator 130, the ADC 140, the output buffer 150, and the column driver 160 with a clock signal required for the operations of the respective components of the image sensing device 100, a control signal for timing control, and address signals for selecting a row or column. In an embodiment of the disclosed technology, the timing controller 170 may include a logic control circuit, a phase lock loop (PLL) circuit, a timing control circuit, a communication interface circuit, and others.

The ISP 200 may perform image processing of image data received from the image sensing device 100. The ISP 200 may reduce noise of image data, and may perform various kinds of image signal processing (e.g. interpolation, synthesis, gamma correction, color filter array interpolation, color/tone correction using color correction matrix (CCM), color correction, color enhancement, lens distortion correction, etc.) for image-quality improvement of the image data. In addition, the ISP 200 may compress image data that has been created by execution of image signal processing for image-quality improvement, such that the ISP 200 can create an image file using the compressed image data. Alternatively, the ISP 200 may recover image data from the image file. In this case, the scheme for compressing such image data may be a reversible format or an irreversible format. As a representative example of such compression format, in the case of using a still image, Joint Photographic Experts Group (JPEG) format, JPEG 2000 format, or the like can be used. In addition, in the case of using moving images, a plurality of frames can be compressed according to Moving Picture Experts Group (MPEG) standards such that moving image files can be created. For example, the image files may be created according to Exchangeable image file format (Exif) standards.

The image signal processor (ISP) 200 may generate an HDR image by synthesizing at least two images having different sensitivities. For example, the image sensing device 100 may output a low-sensitivity image generated from a low-sensitivity pixel (i.e., a low conversion gain pixel) with a relatively lower sensitivity and a high-sensitivity image generated from a high-sensitivity pixel (i.e., a high conversion gain pixel) with a relatively higher sensitivity. The image signal processor (ISP) 200 may combine the low-sensitivity image and the high-sensitivity image, resulting in formation of an HDR image. Here, the low-sensitivity and the high-sensitivity may correspond to relative concepts, the image sensing device 100 may generate image data (IDATA) having at least N different sensitivities (where N is an integer of 2 or more), and the image sensing processor 200 may generate the HDR image using the resultant image data (IDATA).

The ISP 200 may transmit the ISP image data to a host device (not shown). The host device (not shown) may be a processor (e.g. an application processor) for processing the ISP image data received from the ISP 200, memory (e.g. non-volatile memory) for storing the ISP image data, or a display device (e.g. a liquid crystal display (LCD)) for visually displaying the ISP image data.

In addition, the ISP 200 may transmit a control signal for controlling operations (e.g. whether or not to operate, an operation timing, an operation mode, etc.) of the image sensing device 100 to the image sensing device 100.

Figure 2:
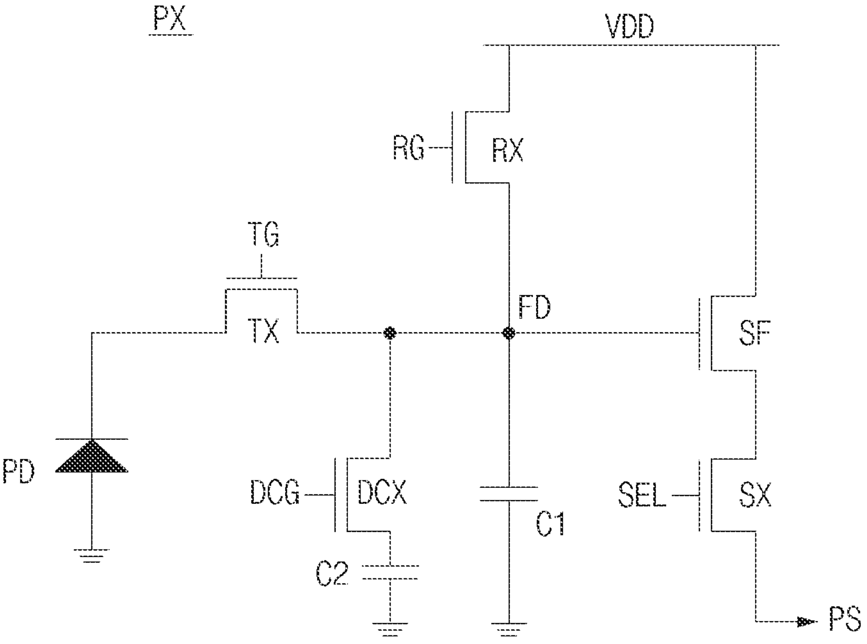
FIG. 2 is a circuit diagram illustrating an example of a pixel included in a pixel array shown in FIG. 1 based on some implementations of the disclosed technology.

FIG. 2 is a circuit diagram illustrating an example of a pixel included in the pixel array 110 shown in FIG. 1 based on some implementations of the disclosed technology.

Referring to FIG. 2, a pixel (PX) may be any one of a plurality of pixels included in the pixel array 110. Although FIG. 2 shows only one pixel (PX) for convenience of description, other implementations are also possible, and it should be noted that other pixels may also have substantially the same structure and operations as in the pixel (PX) without departing from the scope or spirit of the disclosed technology.

Figure 4:
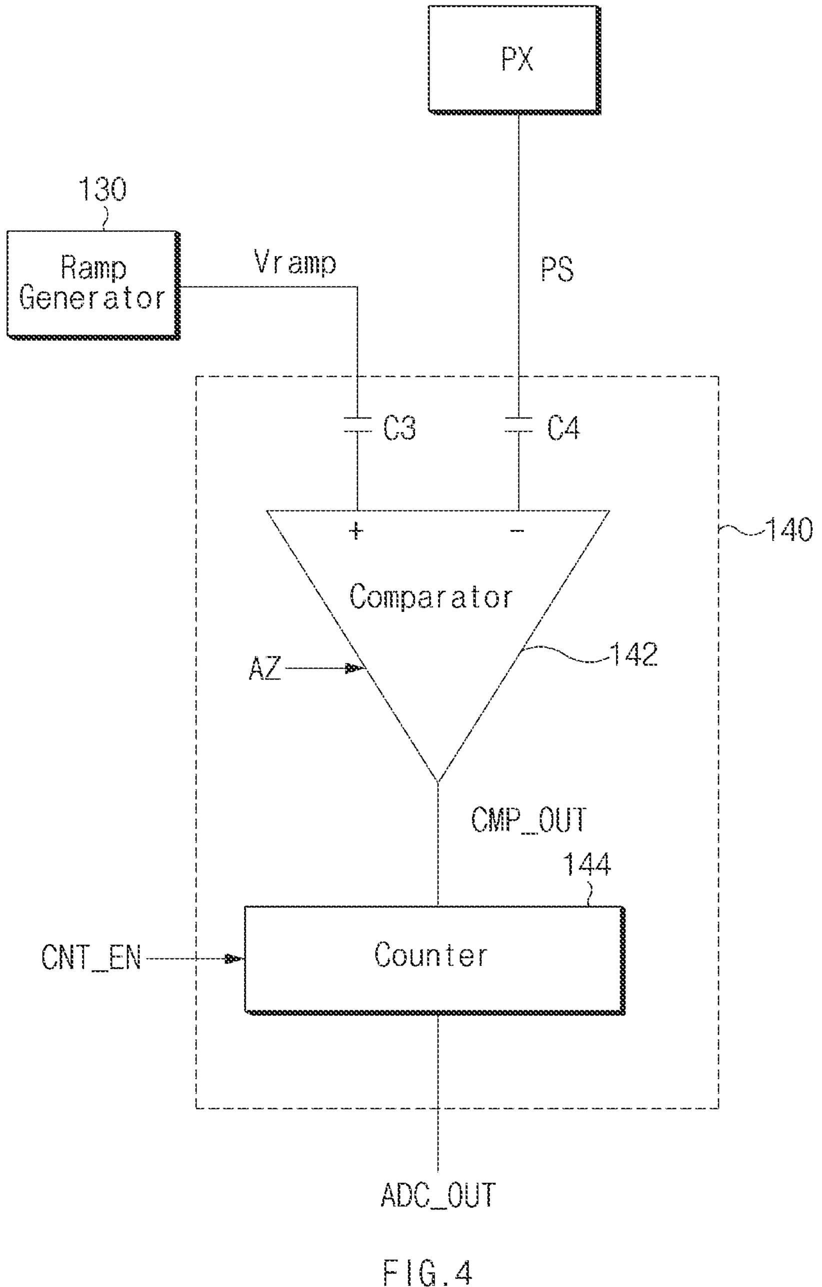
FIG. 4 is a circuit diagram illustrating an example of an analog-to-digital converter (ADC) based on some implementations of the disclosed technology.

The pixel (PX) may include a photoelectric conversion element (PD), a transfer transistor (TX), a reset transistor (RX), a floating diffusion region (FD), a dual conversion gain (DCG) transistor (DCX), first and second capacitors (C1~C2), a source follower transistor (SF), and a selection transistor (SX). Although FIG. 4 shows that the pixel (PX) includes only one photoelectric conversion element (PD), other implementations are also possible, and it should be noted that the pixel (PX) can also be a shared pixel including a plurality of photoelectric conversion elements. In this case, the plurality of transfer transistors may be provided to correspond to the photoelectric conversion elements, respectively.

Each of the photoelectric conversion elements (PDs) may generate and accumulate photocharges corresponding to the intensity of incident light. For example, each of the photoelectric conversion elements (PDs) may be implemented as a photodiode, a phototransistor, a photogate, a pinned photodiode, or a combination thereof.

If the photoelectric conversion element (PD) is implemented as a photodiode, the photoelectric conversion element (PD) may be a region that is doped with second conductive impurities (e.g., N-type impurities) in a substrate including first conductive impurities (e.g., P-type impurities).

The transfer transistor (TX) may be coupled between the photoelectric conversion element (PD) and the floating diffusion region (FD). The transfer transistor (TX) may be turned on or off in response to a transfer control signal (TG). If the transfer transistor (TX) is turned on, photocharges accumulated in the corresponding photoelectric conversion element (PD) can be transmitted to the floating diffusion region (FD).

The reset transistor (RX) may be disposed between the floating diffusion region (FD) and the power-supply voltage (VDD), and the voltage of the floating diffusion region (FD) can be reset to the power-supply voltage (VDD) in response to a reset control signal (RG).

The floating diffusion region (FD) may accumulate photocharges received from the transfer transistor (TX). The floating diffusion region (FD) can be coupled to the first capacitor (C1) connected to a ground terminal. For example, the floating diffusion region (FD) may be a region that is doped with second conductive impurities (e.g., N-type impurities) in a substrate (e.g., a P-type substrate) including first conductive impurities. In this case, the substrate and the impurity doped region can be modeled as the first capacitor (C1) acting as a junction capacitor. The floating diffusion region (FD) may be referred to as a sensing node.

The DCG transistor (DCX) may be coupled between the floating diffusion region (FD) and the second capacitor (C2), and may selectively connect the second capacitor (C2) to the floating diffusion region (FD) in response to a DCG control signal (CG). The second capacitor (C2) may include at least one of a Metal-Insulator-Metal (MIM) capacitor, a Metal-Insulator-Polysilicon (MIP) capacitor, a Metal-Oxide-Semiconductor (MOS) capacitor, and a junction capacitor. When the DCG transistor (DCX) is turned off, the floating diffusion region (FD) may have electrostatic capacity (or the first electrostatic capacity) corresponding to capacitance of the first capacitor (C1). When the DCG transistor (DCX) is turned on, the floating diffusion region (FD) may have capacitance corresponding to the sum of capacitance of the first capacitor (C1) and capacitance of the second capacitor (C2). That is, the DCG transistor (DCX) may control capacitance of the floating diffusion region (FD).

As the DCG control signal (DCG) has a logic high level, the pixel (PX) in a state in which the DCG transistor (DCX) is turned on may operate in a low conversion gain (LCG) mode in which photocharges are converted into electrical signals with a relatively low conversion gain. As the DCG control signal (DCG) has a logic low level, the pixel (PX) in a state in which the DCG transistor (DCX) is turned off may operate in a high conversion gain (HCG) mode in which photocharges are converted into electrical signals with a relatively high conversion gain.

In some implementations, a logic high level may mean a voltage level for activating (e.g., turning on) a corresponding element (e.g., a transistor), and a logic low level may mean a voltage level for deactivating (e.g., turning off) a corresponding element (e.g., a transistor).

Although FIG. 2 shows an example case in which only one DCG transistor (DCX) is used for convenience of description, other implementations are also possible, and a plurality of DCG transistors can also be used. In this case, capacitance of the floating diffusion region (FD) may have a wider variety of values (e.g., three or more values).

The source follower transistor (SF) may be coupled between the selection transistor (SX) and the power-supply voltage (VDD), may amplify a change in electrical potential of the floating diffusion region (FD) that has received photocharges accumulated in the photoelectric conversion element (PD), and may transmit the amplified result to the selection transistor (SX).

The selection transistor (SX) may be coupled between the source follower transistor (SF) and the output signal line, and may be turned on by the selection control signal (SEL), so that the selection transistor (SX) can output the electrical signal received from the source follower transistor (SF) as the pixel signal (PS).

Figure 3:
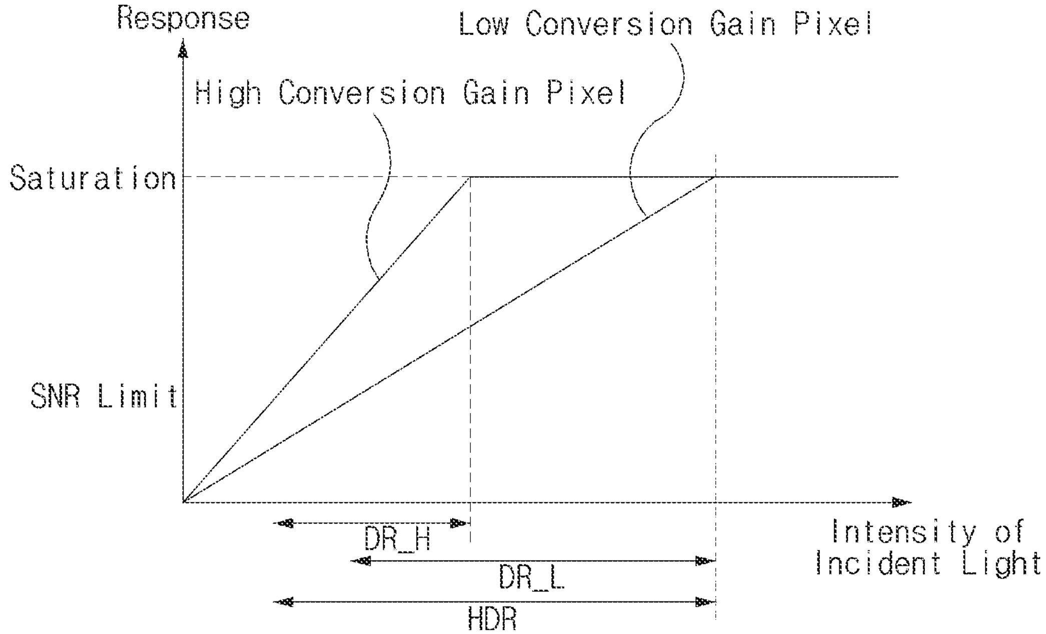
FIG. 3 is a graph illustrating an example of responses depending on luminance of a high conversion gain (HCG) pixel and a low conversion gain (LCG) pixel based on some implementations of the disclosed technology.

FIG. 3 is a graph illustrating an example of responses depending on luminance of a high conversion gain (HCG) pixel and a low conversion gain (LCG) pixel based on some implementations of the disclosed technology.

Referring to FIG. 3, a high conversion gain (HCG) pixel may refer to a pixel operating in an HCG mode, and a low conversion gain (LCG) pixel may refer to a pixel operating in an LCG mode. As can be seen from FIG. 3, in association with a high conversion gain (HCG) pixel having a relatively larger amount of increase in response according to an increase in the intensity of incident light and a low conversion gain (LCG) pixel having a relatively smaller amount of increase in response according to an increase in the intensity of incident light, a response of the HCG pixel and a response of the LCG pixel are changed depending on the intensity of incident light applied to the corresponding pixel. Here, the response may refer to image data (IDATA) of the corresponding pixel.

In this case, the response may have a signal-to-noise ratio (SNR) limit (i.e. an SNR threshold level) and a saturation level.

The signal-to-noise ratio (SNR) threshold level refers to a threshold value that can satisfy a reference SNR that is predetermined. A response less than the SNR threshold level may be treated as an invalid response not satisfying the reference SNR, and a response greater than the SNR threshold level may be treated as a valid response satisfying the reference SNR. The reference SNR may be determined experimentally in consideration of characteristics of the image sensing device 100.

A saturation level refers to a maximum level that indicates the intensity of incident light. The saturation level may be determined by the capability (e.g., capacitance of a photoelectric conversion element) by which the pixel can convert the intensity of incident light into photocharges, the capability (e.g., capacitance of a floating diffusion (FD) region) by which photocharges can be converted into analog signals, and the capability (e.g., an input range of the ADC) by which analog signals can be converted into digital signals. As the intensity of incident light increases, the response may increase in proportion to the intensity of incident light until the response reaches the saturation level. After the response reaches the saturation level, the response may not increase although the intensity of incident light increases. For example, after the response reaches the saturation level, the response may have the same value as the saturation value and not increase above the saturation level.

The valid response of each pixel may refer to a response that can indicate the intensity of incident light while satisfying the reference SNR. The range of the intensity of incident light corresponding to the valid response of a pixel may be referred to as a dynamic range of the pixel. That is, the dynamic range of the pixel may refer to the incident-light intensity range in which each pixel has a valid response.

The HCG pixel provides the response having a relatively large increase in response to an increase in the intensity of incident light. Thus, the response of the HCG pixel may have a relatively greater slope in response to the increase of the intensity of incident light until the response reaches the saturation level and have a fixed level corresponding to the saturation level regardless of the increase in the intensity of incident light after the response reaches the saturation level.

The LCG pixel provides the response having a relatively small increase in response to an increase in the intensity of incident light. Thus, the response of the LCG pixel may increase with a relatively smaller slope in response to the increase of the intensity of incident light until the response reaches the saturation level, and have a fixed level corresponding to the saturation level regardless of the increase in the intensity of incident light after the response reaches the saturation level.

As illustrated in FIG. 3, a minimum value of an HCG-pixel dynamic range (DR_H) (or a first dynamic range) may be less than a minimum value of an LCG-pixel dynamic range (DR_L) (or a second dynamic range), and a maximum value of the HCG-pixel dynamic range (DR_H) may be less than a maximum value of the LCG-pixel dynamic range (DR_L). Therefore, in a low-illuminance range in which the intensity of incident light is relatively small, the HCG pixel may be more suitably used to sense the intensity of incident light. In a high-illuminance range in which the intensity of incident light is relatively large, the LCG pixel may be more suitably used to sense the intensity of incident light.

High dynamic range (HDR) can be implemented using both a response of the HCG pixel suitable for the low-illuminance range and a response of the LCG pixel suitable for the high-illuminance range. In other words, as compared to the other case in which only one of the HCG pixel and the LCG pixel is used, the above-indicated case in which both the HCG pixel and the LCG are used can allow the entire pixel array to have a high dynamic range (HDR) corresponding to a specific range from the minimum value of the HCG-pixel dynamic range to the maximum value of the LCG-pixel dynamic range. To this end, at least a portion of the HCG-pixel dynamic range and at least a portion of the LCG-pixel dynamic range may overlap each other.

A method for synthesizing a high dynamic range (HDR) image corresponding to the high dynamic range (HDR) using the HCG pixel and the LCG pixel may be implemented as a method for synthesizing the HDR image by calculating (e.g., summing) the HCG-pixel response and the LCG-pixel response, and/or a method for forming an image based on the HCG-pixel response at a low-illuminance level and forming an image based on the LCG-pixel response at a high-illuminance level, without being limited thereto.

FIG. 4 is a circuit diagram illustrating an example of the analog-to-digital converter (ADC) 140 based on some implementations of the disclosed technology.

Referring to FIG. 4, the ADC 140 may receive a ramp signal ($V_{ramp}$) from the ramp generator 130, may receive a pixel signal (PS) from the pixel (PX), and may generate and output ADC data (ADC_OUT) based on the ramp signal ($V_{ramp}$) and the pixel signal (PS).

The ADC 140 may include third and fourth capacitors (C3, C4), a comparator 142, and a counter 144.

A third capacitor C3 may receive the ramp signal ($V_{ramp}$), and may transmit the ramp signal ($V_{ramp}$) to the comparator 142. A fourth capacitor C4 may receive the pixel signal (PS) and may transmit the pixel signal (PS) to the comparator 142.

The comparator 142 may compare the ramp signal ($V_{ramp}$) and the pixel signal (PS), may generate comparison data (CMP_OUT) according to the result of performing a comparison, and may transmit the comparison data (CMP_OUT) to the counter 144. In some implementations, when the ramp signal ($V_{ramp}$) is greater than the pixel signal (PS), the comparator 142 may generate comparison data (CMP_OUT) having a logic high level. In addition, when the ramp signal ($V_{ramp}$) is smaller than the pixel signal (PS), the comparator 142 may generate comparison data (CMP_OUT) having a logic low level. That is, the comparison data (CMP_OUT) may indicate the magnitude relationship between the ramp signal ($V_{ramp}$) and the pixel signal (PS).

The comparator 142 may perform an auto-zeroing operation according to an auto-zeroing signal (AZ). Here, the auto-zeroing operation may be an operation for adjusting a voltage level of the ramp signal ($V_{ramp}$) and a voltage level of the pixel signal (PS) for comparison between the ramp signal ($V_{ramp}$) and the pixel signal (PS). The comparator 142 may perform the auto-zeroing operation in a period in which the auto-zeroing signal (AZ) is at a logic high level. The auto-zeroing signal (AZ) may be generated and supplied by the timing controller 170. The comparator 142 may perform the auto-zeroing operation at each of a start time of the HCG mode and a start time of the LCG mode.

The counter 144 may be activated in response to a counter enable signal (CNT_EN), the activated counter 144 may perform counting in response to the logic high level comparison data (CMP_OUT), and may output the counting result as ADC data (ADC_OUT). Here, the ADC data (ADC_OUT) may correspond to the image data (IDATA) described in FIG. 1.

Figure 5:
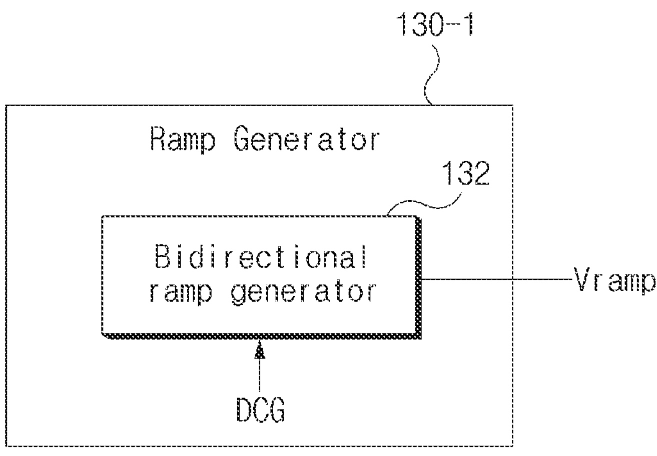
FIG. 5 is a diagram illustrating an example of a ramp generator shown in FIG. 4 based on some implementations of the disclosed technology.

FIG. 5 is a diagram illustrating an example of the ramp generator 130-1 shown in FIG. 4 based on some implementations of the disclosed technology.

Referring to FIG. 5, a ramp generator 130-1 may correspond to an embodiment of the ramp generator 130 of FIG. 4, and the ramp generator 130-1 may be a bidirectional ramp generator 132.

The bidirectional ramp generator 132 may generate a ramp signal ($V_{ramp}$) having a positive (+) slope and a ramp signal ($V_{ramp}$) having a negative (−) slope according to a DCG control signal (DCG). The bidirectional ramp generator 132 may generate a ramp signal ($V_{ramp}$) having a negative (−) slope in response to the DCG control signal (DCG) having a logic low level. The bidirectional ramp generator 132 may generate a ramp signal ($V_{ramp}$) having a positive (+) slope in response to a DCG control signal (DCG) having a logic high level.

For this operation, the bidirectional ramp generator 132 may include a plurality of current sources connected in parallel, a plurality of switches respectively connected to the current sources and sequentially turned on or off, and a load resistor configured to generate a specific voltage upon receiving the current from the current sources, without being limited thereto.

Figure 6:
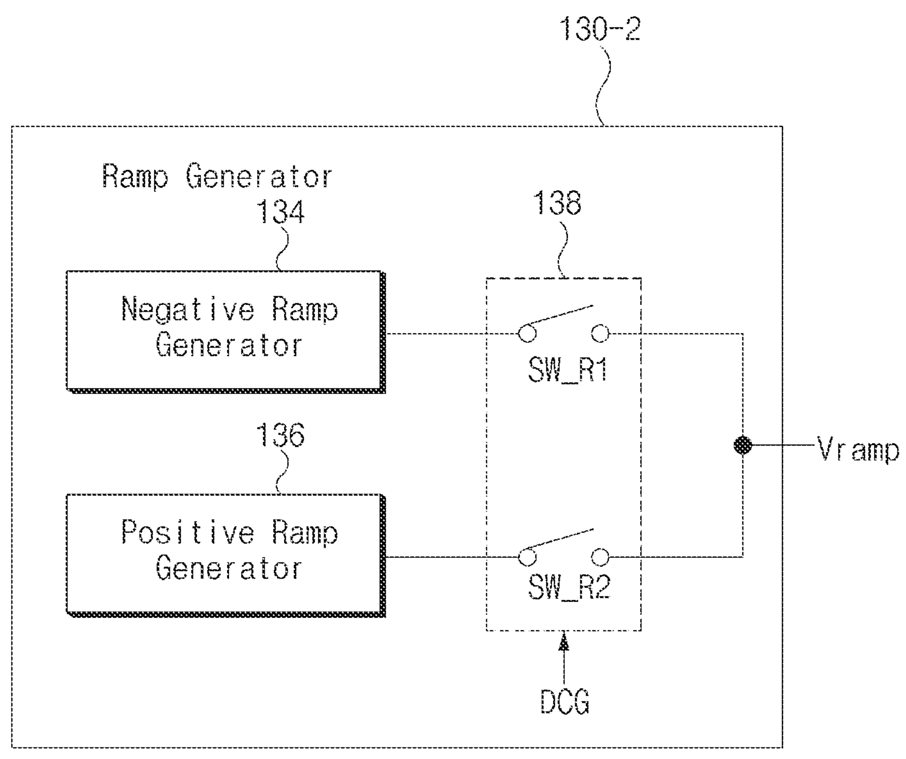
FIG. 6 is a schematic diagram illustrating another example of a ramp generator shown in FIG. 4 based on some implementations of the disclosed technology.

FIG. 6 is a schematic diagram illustrating another example of the ramp generator shown in FIG. 4 based on some implementations of the disclosed technology.

Referring to FIG. 6, a ramp generator 130-2 may correspond to another example of the ramp generator 130 of FIG. 4. The ramp generator 130-2 may include a negative ramp generator 134, a positive ramp generator 136, and a ramp signal selector 138.

The negative ramp generator 134 may generate a ramp signal ($V_{ramp}$) having a negative slope.

The positive ramp generator 136 may generate a ramp signal ($V_{ramp}$) having a positive slope.

The ramp signal selector 138 may select and output either a ramp signal ($V_{ramp}$) having a negative slope or a ramp signal ($V_{ramp}$) having a positive slope according to a DCG control signal (DCG).

The ramp signal selector 138 may include a first ramp switch (SW_R1) and a second ramp switch (SW_R2). The first ramp switch (SW_R1) may be turned on in response to the DCG control signal (DCG) having a logic low level, and may be turned off in response to the DCG control signal (DCG) having a logic high level. The second ramp switch (SW_R2) may be turned on in response to the DCG control signal (DCG) having a logic high level, and may be turned off in response to the DCG control signal (DCG) having a logic low level.

That is, the ramp signal selector 138 may output a ramp signal ($V_{ramp}$) having a negative slope in response to the DCG control signal (DCG) having a logic low level, and may output a ramp signal ($V_{ramp}$) having a negative slope in response to the DCG control signal (DCG) having a logic high level.

For this operation, the negative ramp generator 134 may include a plurality of current sources connected in parallel, a plurality of switches respectively connected to the current sources and sequentially turned off, and a load resistor configured to generate a specific voltage upon receiving the current from the current sources. The positive ramp generator 134 may include a plurality of current sources connected in parallel, a plurality of switches respectively connected to the current sources and sequentially turned on, and a load resistor configured to generate a specific voltage upon receiving the current from the current sources, without being limited thereto.

Figure 7:
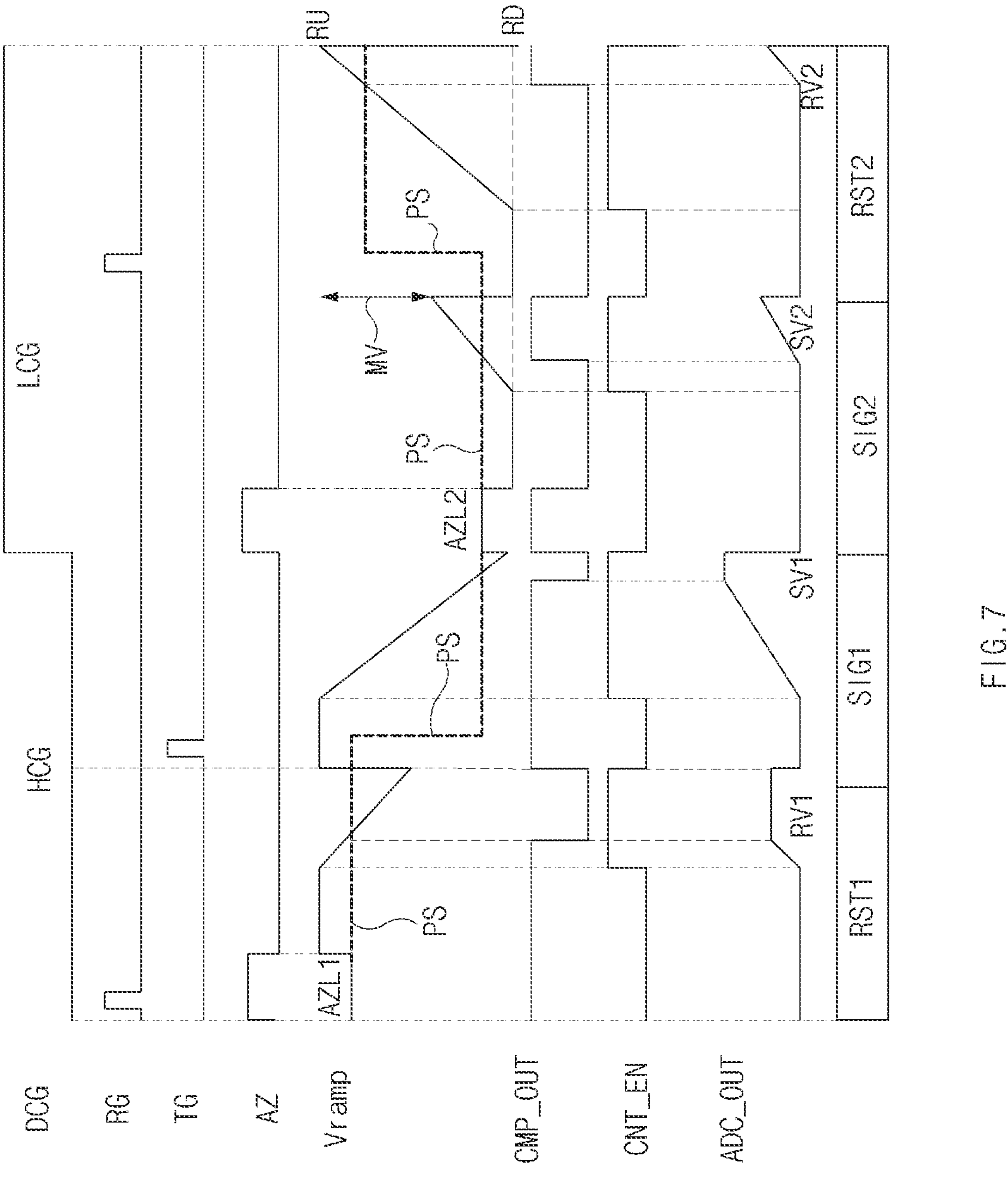
FIG. 7 is a timing diagram illustrating an example operation for converting a pixel signal into image data by an analog-to-digital converter (ADC) shown in FIG. 4 based on some implementations of the disclosed technology.

FIG. 7 is a timing diagram illustrating example operation for converting a pixel signal into image data by the analog-to-digital converter (ADC) shown in FIG. 4 based on some implementations of the disclosed technology.

Referring to FIG. 7, the operation of converting a pixel signal into image data may be performed while being divided into a first reset period (RST1), a first signal period (SIG1), a second signal period (SIG2), and a second reset period (RST2). The first reset period (RST1) may refer to a period in which the reference signal of the pixel (PX) operating in the HCG mode is AD (analog-to-digital) converted, and the first signal period (SIG1) may refer to a period in which the image signal of the pixel (PX) operating in the HCG mode is AD-converted. The second signal period (SIG2) may refer to a period in which the image signal of the pixel (PX) operating in the LCG mode is AD-converted, and the second reset period (RST2) may refer to a period in which the reference signal of the pixel (PX) operating in the LCG mode is AD-converted.

In the first reset period (RST1), the DCG control signal (DCG) may have a logic low level, so that the floating diffusion region (FD) may have a relatively small capacitance. Thereafter, as the pixel reset signal (RG) temporarily has a logic high level, the pixel signal (PS) corresponding to the voltage of the reset floating diffusion region (FD) may be output from the pixel (PX) operating in the HCG mode.

While the auto-zeroing signal (AZ) has a logic high level, the comparator 142 may perform the auto-zeroing operation between the ramp signal ($V_{ramp}$) and the pixel signal (PS). After a predetermined time has elapsed, in response to the DCG control signal (DCG) having a logic low level, the ramp generator 130 may output a ramp signal ($V_{ramp}$) decreasing with a negative slope from a voltage (i.e., a ramp upper limit value RU) increased by a ramp offset from a first auto-zeroing level (AZL1). Here, the ramp offset may be a value representing a degree to which a level of ramping (rising or falling) from a voltage level at which the auto-zeroing was performed according to characteristics of the ramp generator 130 is changed.

The comparison data (CMP_OUT) may have a logic high level in a period in which the ramp signal ($V_{ramp}$) is greater than the pixel signal (PS), and may have a logic low level in a period in which the ramp signal ($V_{ramp}$) is less than the pixel signal (PS).

A counter enable signal (CNT_EN) may have a logic high level in a period in which the ramp signal ($V_{ramp}$) has a positive or negative slope. The counter 144 may be activated in response to the counter enable signal (CNT_EN) having a logic high level, and the activated counter 144 may perform counting in a period in which the comparison data (CMP_OUT) is at the logic high level, and may output a first reference value (RV1) indicating the counting result as ADC data (ADC_OUT).

The first reference value RV1 may be a digital value representing a pixel signal PS (i.e., a reference signal of the HCG mode) corresponding to a voltage of the reset floating diffusion region (FD) of the pixel (PX) operating in the HCG mode.

In the first signal period (SIG1), as the DCG control signal (DCG) has a logic low level and the transfer signal (TG) temporarily has a logic high level, the pixel signal (PS) corresponding to the voltage of the floating diffusion region (FD) in which photocharges generated by the pixel are accumulated can be output from the pixel (PX) operating in the HCG mode. A voltage level of the pixel signal PS may decrease in response to the amount of photocharges accumulated in the floating diffusion region FD.

As the first signal period SIG1 begins, the ramp signal ($V_{ramp}$) may return to the ramp upper limit value (RU).

Then, after a predetermined time elapses, the ramp generator 130 may output the ramp signal ($V_{ramp}$) having a negative slope.

The comparison data (CMP_OUT) may have a logic high level or a logic low level according to the magnitude relationship between the ramp signal ($V_{ramp}$) and the pixel signal (PS).

The counter 144 activated in response to the counter enable signal (CNT_EN) having a logic high level may perform counting in a period in which the comparison data (CMP_OUT) is at the logic high level, and may output a first signal value (SV1) indicating the counting result as ADC data (ADC_OUT).

The first signal value (SV1) may be a digital value indicating a pixel signal PS (i.e., an image signal of the HCG mode) corresponding to a voltage of the floating diffusion region (FD) in which photocharges generated by the pixel (PX) operating in the HCG mode are accumulated.

In the HCG mode, a value corresponding to a voltage difference (i.e., a signal component from which reset noise was removed) between the image signal and the reference signal may be obtained by subtracting the first reference value (RV1) from the first signal value (SV1).

In the second signal period (SIG2), the DCG control signal (DCG) may have a logic high level and the floating diffusion region (FD) may have a relatively large capacitance. The pixel signal (PS) corresponding to the voltage of the floating diffusion region (FD) in which photocharges generated by the pixel PX are accumulated can be output from the pixel (PX) operating in the LCG mode.

While the auto-zeroing signal (AZ) has a logic high level, the comparator 142 may perform the auto-zeroing operation between the ramp signal ($V_{ramp}$) and the pixel signal (PS). After a predetermined time has elapsed, in response to the DCG control signal (DCG) having a logic low level, the ramp generator 130 may output a ramp signal ($V_{ramp}$) increasing with a positive slope from a voltage (i.e., a ramp lower limit value RD) lowered by a ramp offset from a second auto-zeroing level (AZL2).

The auto-zeroing operation should be performed to read out the image signal of the pixel (PX) operating in the LCG mode, but this auto-zeroing operation has disadvantages in that such auto-zeroing is performed based on the pixel signal (PS) corresponding to the voltage of the floating diffusion region (FD) in which photocharges are accumulated. Therefore, when the ramp signal ($V_{ramp}$) having a negative slope is used as in the HCG mode, the magnitude relationship between the ramp signal ($V_{ramp}$) and the pixel signal (PS) cannot be normally compared in the LCG mode, so that the comparison data (ADC_OUT) is unable to represent the image signal of the pixel (PX) operating in the LCG mode.

In some implementations, to normally compare the magnitude relationship between the ramp signal ($V_{ramp}$) and the pixel signal (PS), the ramp signal ($V_{ramp}$) and the pixel signal (PS) can be compared with each other using the ramp signal ($V_{ramp}$) having a positive slope. Here, the slope of the ramp signal ($V_{ramp}$) in the HCG mode and the slope of the ramp signal ($V_{ramp}$) in the LCG mode may have different signs and have the same absolute value.

The counter 144 may be activated in response to the counter enable signal (CNT_EN) having a logic high level, and the activated counter 144 may perform counting in a period in which the comparison data (CMP_OUT) is at the logic high level. Then, the counter 144 may output the second signal value (SV2) indicating the counting result as ADC data (ADC_OUT).

The second signal value (SV2) may be a digital value representing a portion of the pixel signal PS (i.e., an image signal of the LCG mode) corresponding to a voltage of the floating diffusion region (FD) in which photocharges of the pixel (PX) operating in the LCG mode are accumulated, and a sum of the second signal value (SV2) and a margin value (MV) may represent an image signal of the LCG mode. The margin value (MV) may be a digital value corresponding to a difference between a maximum voltage level of the ramp signal ($V_{ramp}$) in the second signal period (SIG2) and the ramp upper limit value (RU), and may be predetermined according to the ramp lower limit value (RD), the ramp starting point and the slope of the ramp signal ($V_{ramp}$).

In the second reset period (RST2), as the pixel reset signal (RG) temporarily has a logic high level, the pixel signal (PS) corresponding to the voltage of the reset floating diffusion region (FD) may be output from the pixel (PX) operating in the LCG mode.

As the second reset period (RST2) is started, the ramp signal ($V_{ramp}$) may return to the ramp lower limit value (RD), and after a predetermined time elapses, the ramp generator 130 may output the ramp signal ($V_{ramp}$) having a positive slope.

The comparison data (CMP_OUT) may have a logic high level or a logic low level according to the magnitude relationship between the ramp signal ($V_{ramp}$) and the pixel signal (PS).

The counter 144 activated in response to the counter enable signal (CNT_EN) having a logic high level may perform counting in the period in which the comparison data (CMP_OUT) is at a logic high level, and may output the second reset value (RV2) indicating the counting result as ADC data (ADC_OUT).

The second reset value (RV2) may be a digital value representing the pixel signal PS (i.e., the reference signal of the LCG mode) corresponding to the voltage of the reset floating diffusion region (FD) of the pixel (PX) operating in the LCG mode.

In the LCG mode, a value corresponding to a voltage difference (i.e., a signal component from which reset noise was removed) between the image signal and the reference signal may be obtained by subtracting the second reference value (RV2) from the sum of the second signal value (SV2) and the margin value (MV).

Here, the second signal value (SV2) may be maintained at a constant value by the auto-zeroing operation in the LCG mode, and the second reference value (RV2) may vary depending on the amount of photocharges.

Figure 8:
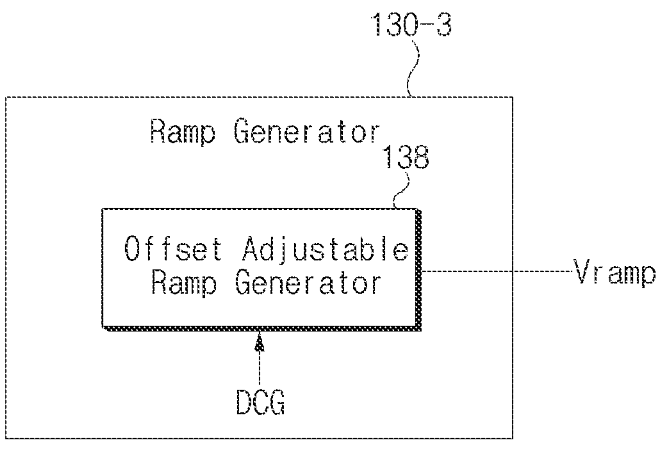
FIG. 8 is a diagram illustrating another example of a ramp generator shown in FIG. 4 based on some implementations of the disclosed technology.

FIG. 8 is a diagram illustrating another example of the ramp generator shown in FIG. 4 based on some implementations of the disclosed technology.

Referring to FIG. 8, a ramp generator 130-3 may correspond to an example of the ramp generator 130 of FIG. 4, and the ramp generator 130-3 may include an offset adjustable ramp generator 138.

The offset adjustable ramp generator 138 may generate a ramp signal ($V_{ramp}$) having a negative slope. Here, after the DCG control signal (DCG) transitions from a logic low level to a logic high level, the offset adjustable ramp generator 138 may generate an offset-adjusted ramp signal ($V_{ramp}$) in a specific period. In this case, the specific period may be a period corresponding to the second reset period (RST2) shown in FIG. 9. In addition, the expression "offset adjustment" may mean the overall adjustment of the voltage level of the ramp signal ($V_{ramp}$). For example, the offset adjustment may refer to an operation of lowering the voltage level of the ramp signal ($V_{ramp}$) by a specific voltage (i.e., a voltage corresponding to a signal offset (SOF) shown in FIG. 9). The signal offset (SOF) may be provided in real time from an external device (e.g., the ISP 200 configured to calculate a difference between the first reference value RV2 obtained from the first reset period RST1 and the first signal value SV1 obtained from the first signal period SIG1), or may be a predetermined voltage, but the scope of the disclosed technology is not limited thereto.

For this operation, the offset adjustable ramp generator 138 may include a plurality of current sources connected in parallel, a plurality of switches respectively connected to the current sources and sequentially turned on or off, and a load resistor configured to generate a specific voltage upon receiving the current from the current sources. The load resistor may be a variable resistor that can temporarily change a resistance value to perform offset adjustment, without being limited thereto.

Figure 9:
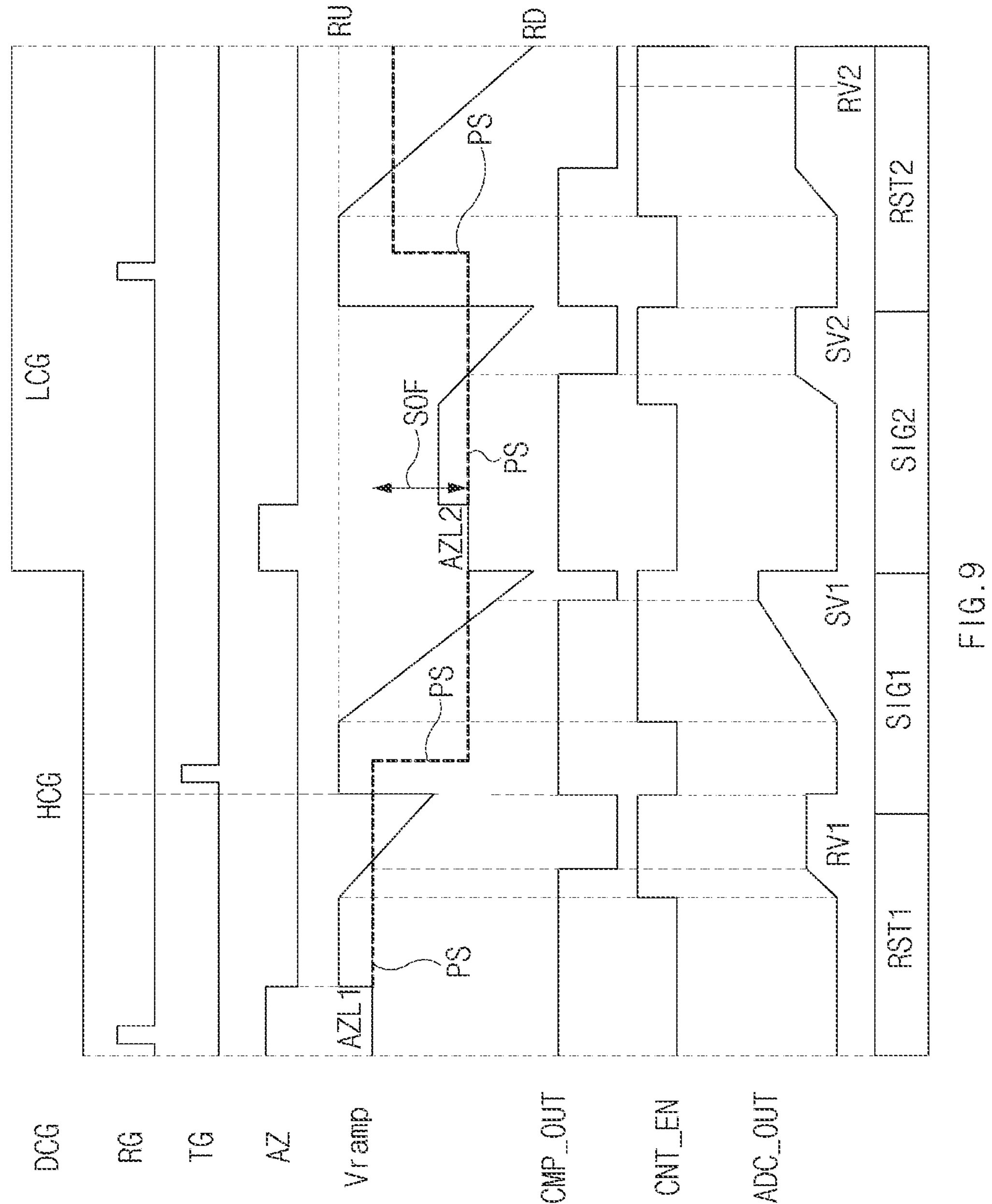
FIG. 9 is a timing diagram illustrating example operation for converting a pixel signal into image data by an analog-to-digital converter (ADC) shown in FIG. 8 based on some implementations of the disclosed technology.

FIG. 9 is a timing diagram illustrating example operation for converting a pixel signal into image data by the ADC shown in FIG. 8 based on some implementations of the disclosed technology.

Referring to FIG. 9, the operation of converting the pixel signal into image data may be performed while being divided into a first reset period (RST1), a first signal period (SIG1), a second signal period (SIG2), and a second reset period (RST2).

The remaining operations of the periods (RST1, SIG1, SIG2, RST2) of FIG. 9 except for some differences distinguished from those of the periods (RST1, SIG1, SIG2, RST2) of FIG. 7 are substantially the same as those of FIG. 7, so that the timing diagram of FIG. 9 will hereinafter be described centering upon such differences distinguished from those of FIG. 7.

In the second signal period (SIG2), the DCG control signal (DCG) may have a logic high level and the floating diffusion region (FD) may have a relatively larger capacitance. The pixel signal (PS) corresponding to the voltage of the floating diffusion region (FD) in which photocharges generated by the pixel (PX) are accumulated may be output from the pixel (PX) operating in the LCG mode.

While the auto-zeroing signal (AZ) has a logic high level, the comparator 142 may perform the auto-zeroing operation between the ramp signal ($V_{ramp}$) and the pixel signal (PS). After a predetermined time has elapsed, the ramp generator 130 may output the ramp signal ($V_{ramp}$) that falls (or descends) with a negative slope in response to the logic high level DCG control signal (DCG).

The voltage level at which the ramp signal ($V_{ramp}$) starts to fall in the second signal period SIG2 may be lower than, by a signal offset (SOF), the voltage level at which the ramp signal ($V_{ramp}$) starts to fall in the second reset period (RST2). The signal offset (SOF) may be a digital value corresponding to a voltage difference between the first auto-zeroing level (AZL1) and the second auto-zeroing level (AZL2). Alternatively, the signal offset (SOF) may be determined according to a voltage difference between the reference signal and the image signal in the HCG mode. In some implementations, the signal offset (SOF_offset) may be set to a level at which a second signal value (SV2) and a second reset value (RV2), which can normally indicate the intensity of incident light, can be generated even in a dark condition in which the intensity of incident light is low in the LCG mode on the basis of a voltage level (i.e., the first auto-zeroing level AZL1) of the reference signal in the HCG mode.

The counter 144 may be activated in response to the counter enable signal (CNT_EN) having a logic high level, and the activated counter 144 may perform counting in a period in which the comparison data (CMP_OUT) is at the logic high level. Then, the counter 144 may output the second signal value (SV2) as ADC data (ADC_OUT).

The second signal value (SV2) may be a digital value representing a portion of the pixel signal PS (i.e., an image signal of the LCG mode) corresponding to a voltage of the floating diffusion region (FD) in which photocharges of the pixel (PX) operating in the LCG mode are accumulated, and the sum of the second signal value (SV2) and the signal offset (SOF) may represent the image signal of the LCG mode.

In the second reset period (RST2), as the pixel reset signal (RG) temporarily has a logic high level, the pixel signal (PS) corresponding to the voltage of the reset floating diffusion region (FD) may be output from the pixel (PX) operating in the LCG mode.

As the second reset period (RST2) is started, the ramp signal ($V_{ramp}$) has a voltage level higher than, by the signal offset (SOF), a voltage level at which the ramp signal ($V_{ramp}$) starts to fall in the second signal period SIG2. After lapse of a predetermined time, the offset adjustable ramp generator 130-3 may output the ramp signal ($V_{ramp}$) having a negative slope.

That is, as can be seen from FIG. 9, the ramp signal ($V_{ramp}$) having a negative slope may be used instead of using the ramp signal ($V_{ramp}$) having a positive slope, and an offset-adjusted ramp signal ($V_{ramp}$) may be used. As a result, the magnitude of the ramp signal ($V_{ramp}$) and the magnitude of the pixel signal (PS) can be normally compared with each other.

The comparison data (CMP_OUT) may have a logic high level or a logic low level according to the magnitude relationship between the ramp signal ($V_{ramp}$) and the pixel signal (PS).

The counter 144 activated in response to the counter enable signal (CNT_EN) having a logic high level may perform counting in the period in which the comparison data (CMP_OUT) is at a logic high level, and may output the second reset value (RV2) indicating the counting result as ADC data (ADC_OUT).

The second reset value (RV2) may be a digital value representing the pixel signal PS (i.e., the reference signal of the LCG mode) corresponding to the voltage of the reset floating diffusion region (FD) of the pixel (PX) operating in the LCG mode.

In the LCG mode, a value corresponding to a voltage difference between the image signal and the reference signal (i.e., the signal component from which the reset noise was removed) can be obtained by subtracting the second reference value (RV2) from the sum of the second signal value (SV2) and the signal offset (SOF). Here, the second signal value (SV2) can be maintained at a constant value by the auto-zeroing operation in the LCG mode, and the second reference value (RV2) may vary depending on the amount of photocharges.

Figure 10:
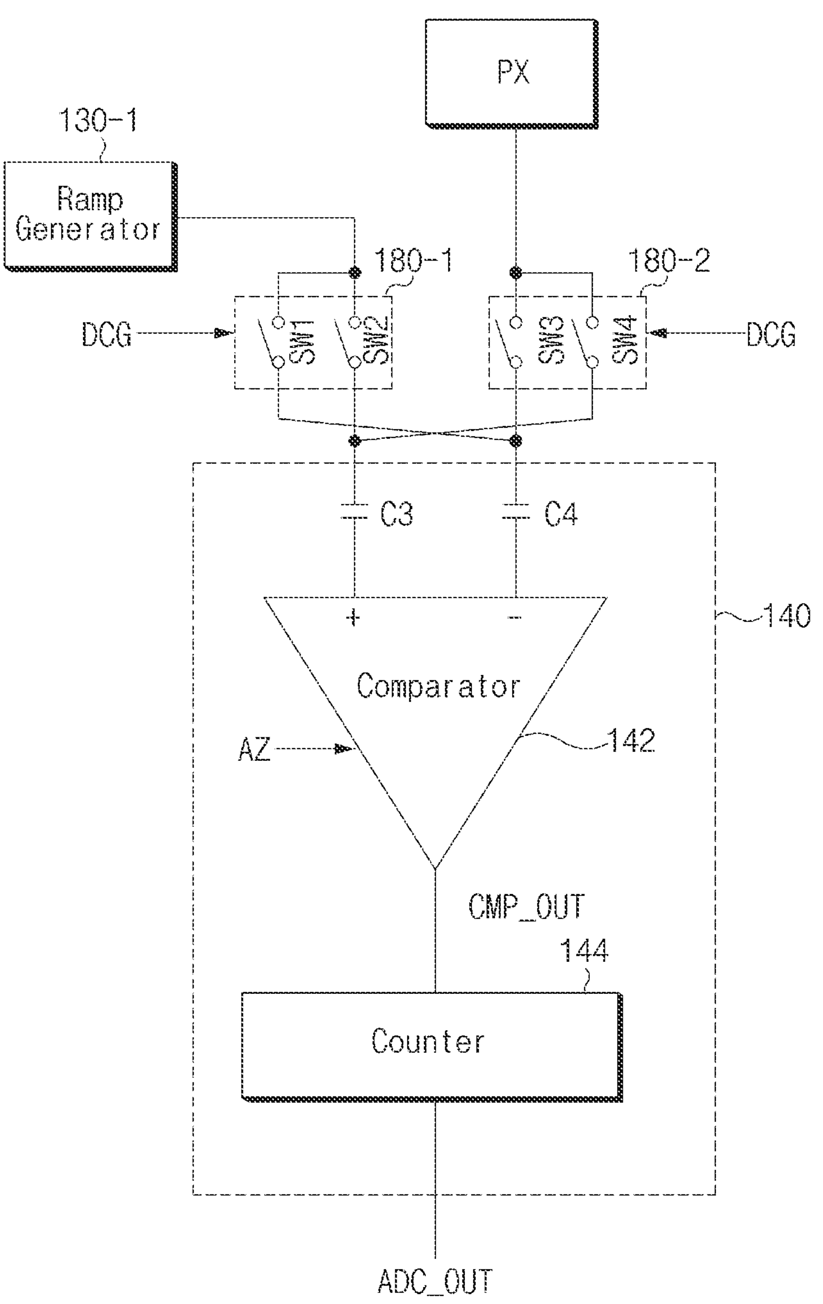
FIG. 10 is a schematic diagram illustrating an example of an analog-to-digital converter (ADC) based on some implementations of the disclosed technology.

FIG. 10 is a schematic diagram illustrating an example of the analog-to-digital converter (ADC) based on some other implementations of the disclosed technology.

Referring to FIG. 10, the ADC 140 may be indirectly coupled to the pixel (PX) and the ramp generator 130-1 of FIG. 5, a first path control circuit 180-1 may be connected between the ramp generator 130-1 and the ADC 140, and a second path control circuit 180-2 may be connected between the pixel (PX) and the ADC 140.

The first path control circuit 180-1 may transmit the ramp signal ($V_{ramp}$) of the ramp generator 130-1 to a non-inverting terminal of the comparator 142 through the third capacitor C3 in response to the DCG control signal (DCG) having a logic low level. The first path control circuit 180-1 may transmit the ramp signal ($V_{ramp}$) of the ramp generator 130-1 to an inverting terminal of the comparator 142 through the fourth capacitor C4 in response to the DCG control signal (DCG) having a logic high level.

To this end, the first path control circuit 180-1 may include a first switch SW1 that is opened by the logic low level DCG control signal (DCG) and short-circuited by the logic high level DCG control signal (DCG), and a second switch SW2 that is short-circuited by the logic low level DCG control signal (DCG) and opened by the logic high level DCG control signal (DCG).

The second path control circuit 180-2 may transmit the pixel signal (PS) of the pixel (PX) to the inverting terminal of the comparator 142 through the fourth capacitor C4 in response to the logic low level DCG control signal (DCG). The second path control circuit 180-2 may transmit the pixel signal (PS) of the pixel (PX) to the non-inverting terminal of the comparator 142 through the third capacitor C3 in response to the logic high level DCG control signal (DCG).

To this end, the second path control circuit 180-2 may include a third switch SW3 that is short-circuited by the logic low level DCG control signal (DCG) and opened by the logic high level DCG control signal (DCG), and a fourth switch SW4 that is opened by the logic low level DCG control signal (DCG) and short-circuited by the logic high level DCG control signal (DCG).

In each of the HCG mode in which the DCG control signal (DCG) is at a logic low level and the LCG mode in which the DCG control signal (DCG) is at a logic high level, the first path control circuit 180-1 and the second path control circuit 180-2 may transmit a signal of the pixel side and a signal of the ramp generator side to terminals opposite to each other as input signals of the comparator 142.

Figure 11:
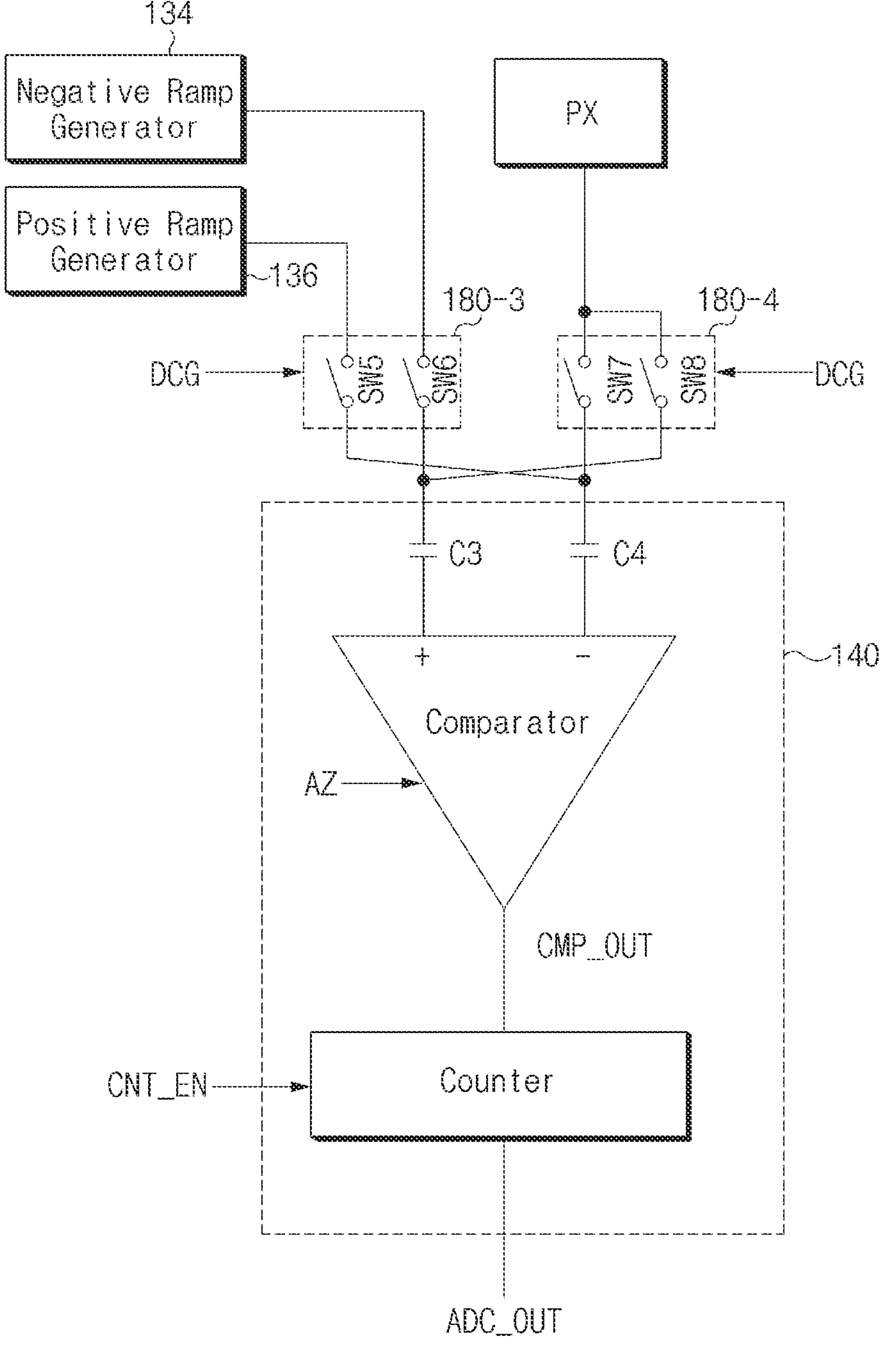
FIG. 11 is a schematic diagram illustrating another example of an analog-to-digital converter (ADC) based on some implementations of the disclosed technology.

FIG. 11 is a schematic diagram illustrating another example of the analog-to-digital converter (ADC) based on some implementations of the disclosed technology.

Referring to FIG. 11, the ADC 140 may be indirectly coupled to the pixel (PX) and the ramp generators (134, 136) of FIG. 6, the third path control circuit 180-3 may be coupled between the ADC 140 and the ramp generators (134, 136), and the fourth path control circuit 180-4 may be coupled between the pixel (PX) and the ADC 140.

The third path control circuit 180-3 may transmit the ramp signal ($V_{ramp}$) of the negative ramp generator 134 to the non-inverting terminal of the comparator 142 through the third capacitor C3 in response to the DCG control signal (DCG) having a logic low level. The third path control circuit 180-3 may transmit the ramp signal ($V_{ramp}$) of the positive ramp generator 136 to the inverting terminal of the comparator 142 through the fourth capacitor C4 in response to the DCG control signal (DCG) having a logic high level.

To this end, the third path control circuit 180-3 may include a fifth switch SW5 that is opened by the logic low level DCG control signal (DCG) and short-circuited by the logic high level DCG control signal (DCG), and a sixth switch SW6 that is short-circuited by the logic low level DCG control signal (DCG) and opened by the logic high level DCG control signal (DCG).

The fourth path control circuit 180-4 may transmit the pixel signal (PS) of the pixel (PX) to the inverting terminal of the comparator 142 through the fourth capacitor C4 in response to the DCG control signal (DCG) having a logic low level. The fourth path control circuit 180-4 may transmit the pixel signal (PS) of the pixel (PX) to the non-inverting terminal of the comparator 142 through the third capacitor C3 in response to the DCG control signal (DCG) having a logic high level.

To this end, the fourth path control circuit 180-2 may include a seventh switch SW7 that is short-circuited by the logic low level DCG control signal (DCG) and opened by the logic high level DCG control signal (DCG), and an eighth switch SW8 that is opened by the logic low level DCG control signal (DCG) and shorted by the logic high level DCG control signal (DCG).

In each of the HCG mode in which the DCG control signal (DCG) is at a logic low level and the LCG mode in which the DCG control signal (DCG) is at a logic high level, the third path control circuit 180-3 and the fourth path control circuit 180-4 may transmit a signal of the pixel side and a signal of the ramp generator side to terminals opposite to each other as input signals of the comparator 142.

Figure 12:
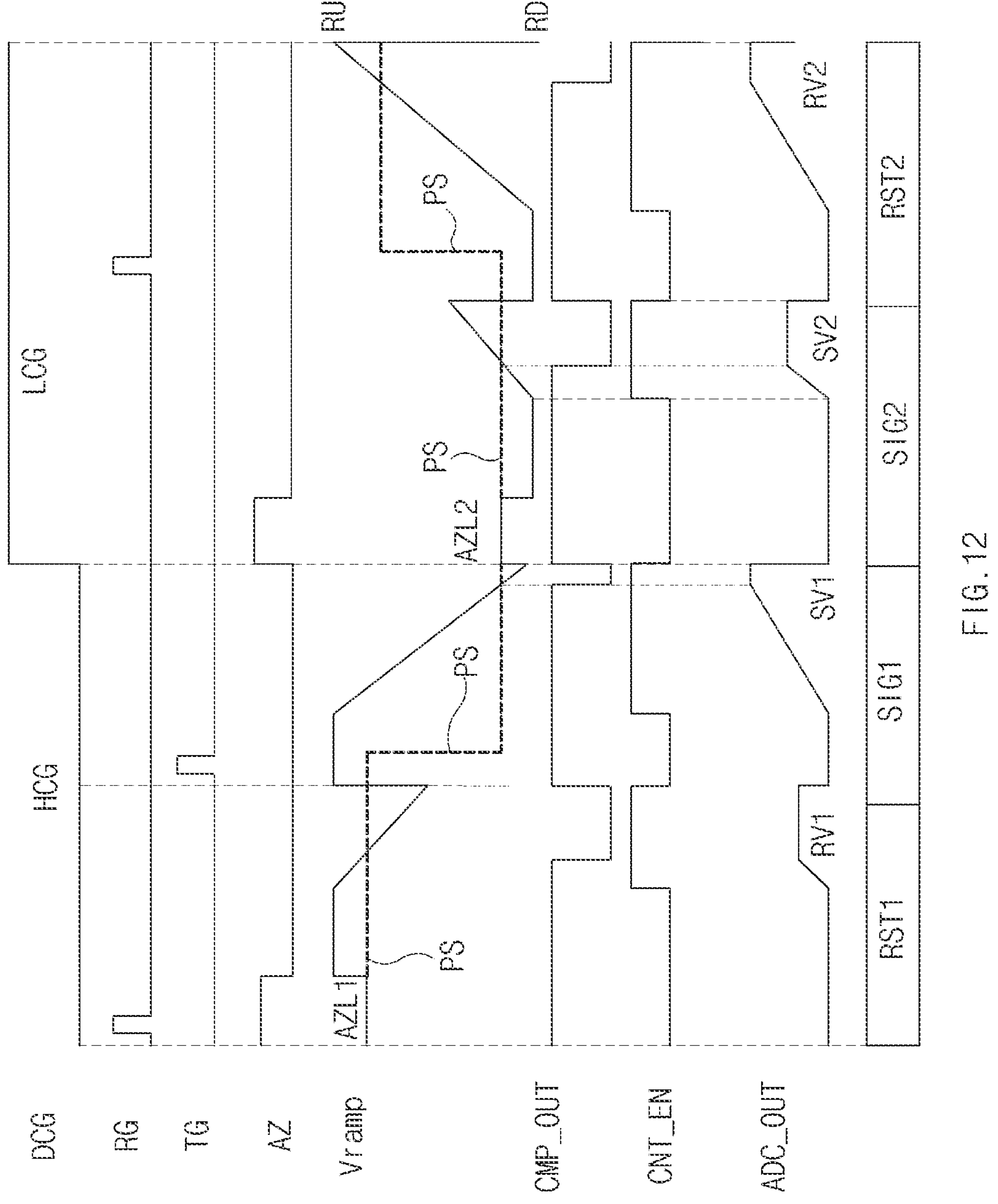
FIG. 12 is a timing diagram illustrating example operation for converting a pixel signal into image data by an analog-to-digital converter (ADC) shown in FIG. 10 or FIG. 11 based on some implementations of the disclosed technology.

FIG. 12 is a timing diagram illustrating example operation for converting the pixel signal into image data by the analog-to-digital converter (ADC) shown in FIG. 10 or FIG. 11 based on some implementations of the disclosed technology.

Referring to FIG. 12, the operation of converting the pixel signal into image data may be performed while being divided into a first reset period (RST1), a first signal period (SIG1), a second signal period (SIG2), and a second reset period (RST2). The remaining operations of the periods (RST1, SIG1, SIG2, RST2) of FIG. 12 except for some differences distinguished from those of the periods (RST1, SIG1, SIG2, RST2) of FIG. 7 are substantially the same as those of FIG. 7, so that the timing diagram of FIG. 12 will hereinafter be described centering upon such differences distinguished from those of FIG. 7.

In the second signal period (SIG2), the DCG control signal (DCG) may have a logic high level and the floating diffusion region (FD) may have a relatively larger capacitance. The pixel signal (PS) corresponding to the voltage of the floating diffusion region (FD) in which photocharges generated by the pixel (PX) are accumulated may be output from the pixel (PX) operating in the LCG mode.

While the auto-zeroing signal (AZ) has a logic high level, the comparator 142 may perform the auto-zeroing operation between the ramp signal ($V_{ramp}$) and the pixel signal (PS). After a predetermined time has elapsed, the ramp generator 130 may output the ramp signal ($V_{ramp}$) that rises (or increases) with a positive slope from the ramp lower limit value (RD) in response to the logic high level DCG control signal (DCG).

The counter 144 may be activated in response to the counter enable signal (CNT_EN) having a logic high level, and the activated counter 144 may perform counting in a period in which the comparison data (CMP_OUT) is at the logic high level. Then, the counter 144 may output the second signal value SV2 as ADC data (ADC_OUT).

The comparison data (CMP_OUT) corresponds to a result of comparison between the ramp signal ($V_{ramp}$) and the pixel signal (PS). In the HCG mode, the ramp signal ($V_{ramp}$) may be input to the non-inverting terminal of the comparator 142 and the pixel signal (PS) may be input to the inverting terminal of the comparator 142, so that the comparison data (CMP_OUT) of the HCG mode may have the same waveform as the comparison data (CMP_OUT) of FIG. 7.

However, in the LCG mode, because the ramp signal ($V_{ramp}$) is input to the inverting terminal of the comparator 142 and the pixel signal (PS) is input to the non-inverting terminal of the comparator 142, the remaining parts of the comparison data (CMP_OUT) in the LCG mode except for the period in which the auto-zeroing operation is performed may have a waveform corresponding to an inversion format of the waveform of the comparison data (CMP_OUT) of FIG. 7.

Accordingly, the second signal value (SV2) may be a digital value indirectly indicating the pixel signal PS (i.e., an image signal of the LCG mode) corresponding to the voltage of the floating diffusion region (FD) in which photocharges of the pixel (PX) operating in the LCG mode are accumulated, and a value obtained by subtracting the second signal value (SV2) from a total signal value corresponding to the entire signal range (AZL1~AZL2) may represent an image signal of the LCG mode. The entire signal range (AZL1~AZL2) may refer to a voltage range in which the ramp signal ($V_{ramp}$) rises or falls with a certain slope to generate image data indicating the pixel signal (PS) through the result of comparison between the ramp signal ($V_{ramp}$) and the pixel signal (PS).

In the second reset period (RST2), as the pixel reset signal (RG) temporarily has a logic high level, the pixel signal (PS) corresponding to the voltage of the reset floating diffusion region (FD) may be output from the pixel (PX) operating in the LCG mode.

As the second reset period RST2 is started, the ramp signal ($V_{ramp}$) may return to the ramp lower limit value (RD), and after lapse of a predetermined time, the ramp generator 130 may output the ramp signal ($V_{ramp}$) having a positive slope.

The comparison data (CMP_OUT) may have a logic high level or a logic low level according to the magnitude relationship between the ramp signal ($V_{ramp}$) and the pixel signal (PS).

The counter 144 activated in response to the counter enable signal (CNT_EN) having a logic high level may perform counting in the period in which the comparison data (CMP_OUT) is at a logic high level, and may output the second reset value (RV2) indicating the counting result as ADC data (ADC_OUT).

As described above, in the LCG mode, because the ramp signal ($V_{ramp}$) is input to the inverting terminal of the comparator 142 and the pixel signal (PS) is input to the non-inverting terminal of the comparator 142, the remaining parts of the comparison data (CMP_OUT) in the LCG mode except for the period in which the auto-zeroing operation is performed may have a waveform corresponding to an inversion format of the waveform of the comparison data (CMP_OUT) of FIG. 7.

Accordingly, the second reset value (RV2) may be a digital value indirectly indicating the pixel signal PS (i.e., a reference signal of the LCG mode) corresponding to the voltage of the reset floating diffusion region (FD) of the pixel (PX) operating in the LCG mode, and a value obtained by subtracting the second reset value (RV2) from a total signal value corresponding to the entire signal range (AZL1~AZL2) may represent the reference signal in the LCG mode.

In the LCG mode, a value corresponding to a voltage difference (i.e., a signal component from which reset noise was removed) between the image signal and the reference signal can be obtained by subtracting a first value obtained by subtracting the second reset value (RV2) from the total signal value from a second value obtained by subtracting the second signal value (SV2) from the total signal value. In other words, the signal component from which the reset noise was removed may be obtained by subtracting the second signal value (SV2) from the second reset value (RV2). Here, the second signal value (SV2) may be maintained at a constant value by the auto-zeroing operation in the LCG mode, and the second reference value (RV2) may vary depending on the amount of photocharges.

Operations such as summation or subtraction between data pieces described in FIGS. 7, 9, and 12 may be performed by the ISP 200, but the scope of the disclosed technology is not limited thereto, and it should be noted that such summation or subtraction (e.g., subtraction using a mixed method of up-counting and down-counting operations for use in the counter 144) between the data pieces of FIGS. 7, 9, and 12 can also be performed in the image sensing device 100.

The image sensing device based on some implementations of the disclosed technology can perform analog-to-digital conversion using a pair of one comparator and one counter for each column line (for each pixel), thereby significantly reducing the size of the analog-to-digital converter (ADC) 140.

In addition, because the image sensing device based on some implementations of the disclosed technology performs auto-zeroing once more before reading out the image signal of the LCG mode after reading out the image signal of the HCG mode, the image sensing device can set the auto-zeroing level regardless of the switching noise generated when switching from the HCG mode to the LCG mode, so that the image sensing device can perform accurate analog-to-digital conversion in the LCG mode without securing an additional ramping range.

As is apparent from the above description, the image sensing device and the imaging device including the same based on some implementations of the disclosed technology can perform analog-to-digital conversion using a pair of one comparator and one counter for each column line (or each pixel) of a pixel array, thereby significantly reducing the size of an analog-to-digital converter (ADC).

The embodiments of the disclosed technology may provide a variety of effects capable of being directly or indirectly recognized through the above-indicated patent document.

Although a number of illustrative embodiments have been described, it should be understood that modifications and enhancements to the disclosed embodiments and other embodiments can be devised based on what is described and/or illustrated in this patent document.

What is claimed is:

1. An image sensing device comprising:

a pixel configured to output a reference signal corresponding to a sensing node that is reset and an image signal corresponding to the sensing node in which photocharges are accumulated, in each of a high conversion gain (HCG) mode in which the sensing node has a first capacitance and a low conversion gain (LCG) mode in which the sensing node has a second capacitance greater than the first capacitance;

an analog-to-digital converter (ADC) configured to sequentially perform analog-to-digital conversion of the reference signal of the HCG mode, the image signal of the HCG mode, the image signal of the LCG mode, and the reference signal of the LCG mode; and a ramp generator configured to generate a first ramp signal having a negative slope, the first ramp signal being used for analog-to-digital conversion in the HCG mode, and to generate a second ramp signal having a positive slope, the second ramp signal being used for analog-to-digital conversion in the LCG mode while having a waveform different from that of the first ramp signal, wherein the analog-to-digital converter (ADC) comprises:

a comparator configured to generate comparison data indicating a result of comparison between a pixel signal having both the reference signal and the image signal and a ramp signal having both the first ramp signal and the second ramp signal; and a counter configured to generate ADC data indicating a result of counting in a period in which the comparison data is at a logic high level, and wherein the comparator comprises:

a non-inverting terminal configured to receive the first ramp signal in the HCG mode and receive the pixel signal in the LCG mode; and an inverting terminal configured to receive the pixel signal in the HCG mode and receive the second ramp signal in the LCG mode.

2. The image sensing device according to claim 1, wherein:

the ramp generator is configured to perform an auto-zeroing operation for adjusting a pixel signal having both the reference signal and the image signal and a ramp signal having both the first ramp signal and the second ramp signal, at each of a time point at which the HCG mode is started and a time point at which the LCG mode is started.

3. The image sensing device according to claim 1, wherein:

the slope of the first ramp signal and the slope of the second ramp signal have the same absolute value.

4. The image sensing device according to claim 1, wherein the ramp generator comprises:

a bidirectional ramp generator configured to generate the first ramp signal or the second ramp signal in response to a dual conversion gain (DCG) control signal for selecting the HCG mode or the LCG mode.

5. The image sensing device according to claim 1, wherein the ramp generator comprises:

a negative ramp generator configured to generate the first ramp signal; and a positive ramp generator configured to generate the second ramp signal.

6. The image sensing device according to claim 1, wherein the pixel further includes:

a dual conversion gain (DCG) transistor connected between the sensing node and a dual conversion gain (DCG) capacitor, wherein the DCG transistor is turned off in the HCG mode and is turned on in the LCG mode.

7. An imaging device comprising:

an image sensing device configured to generate image data based on each of a reference signal corresponding to a sensing node that is reset and an image signal corresponding to the sensing node in which photocharges are accumulated, in each of a high conversion gain (HCG) mode in which the sensing node has a first capacitance and a low conversion gain (LCG) mode in which the sensing node has a second capacitance greater than the first capacitance; and an image signal processor configured to generate a high dynamic range (HDR) image using image data generated in the HCG mode and image data generated in the LCG mode, wherein the image sensing device comprises:

an analog-to-digital converter (ADC) configured to sequentially perform analog-to-digital conversion of the reference signal of the HCG mode, the image signal of the HCG mode, the image signal of the LCG mode, and the reference signal of the LCG mode; and a ramp generator configured to generate a first ramp signal having a negative slope, the first ramp signal being used for analog-to-digital conversion in the HCG mode and to generate a second ramp signal having a positive slope, the second ramp signal being used for analog-to-digital conversion in the LCG mode while having a waveform different from that of the first ramp signal, wherein the ADC comprises a comparator that has a non-inverting terminal for receiving the first ramp signal and the second ramp signal in each of the HCG mode and the LCG mode and an inverting terminal for receiving the pixel signal in each of the HCG mode and the LCG mode; and wherein the image signal processor subtracts a reference value obtained by conversion of the reference signal of the LCG mode from a sum of a signal value obtained by conversion of the image signal of the LCG mode and a margin value, and acquires image data corresponding to a voltage difference between the image signal and the reference signal in the LCG mode.

8. An image sensing device comprising:

a pixel configured to output a reference signal corresponding to a sensing node that is reset and an image signal corresponding to the sensing node in which photocharges are accumulated, in each of a high conversion gain (HCG) mode in which the sensing node has a first capacitance and a low conversion gain (LCG) mode in which the sensing node has a second capacitance greater than the first capacitance;

an analog-to-digital converter (ADC) configured to sequentially perform analog-to-digital conversion of the reference signal of the HCG mode, the image signal of the HCG mode, the image signal of the LCG mode, and the reference signal of the LCG mode; and a ramp generator configured to generate a first ramp signal that is used for analog-to-digital conversion in the HCG mode, and to generate a second ramp signal that is used for analog-to-digital conversion in the LCG mode, wherein each of the first ramp signal and the second ramp signal has a negative slope; and wherein a voltage level at which the second ramp signal starts to fall for readout of the image signal of the LCG mode is lower by a signal offset than a voltage level at which the second ramp signal starts to fall for readout of the reference signal of the LCG mode.

* * * * *